United States Patent
Spies et al.

(10) Patent No.: US 11,939,469 B2
(45) Date of Patent: Mar. 26, 2024

(54) THERMOPLASTIC MOLDING MATERIAL

(71) Applicant: BASF SE, Ludwigshafen am Rhein (DE)

(72) Inventors: Patrick Spies, Ludwigshafen (DE); Jasmina Simon, Ludwigshafen (DE); Sebastian Allinger, Ludwigshafen (DE); Martin Weber, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 364 days.

(21) Appl. No.: 17/258,556

(22) PCT Filed: Aug. 12, 2019

(86) PCT No.: PCT/EP2019/071608
§ 371 (c)(1),
(2) Date: Jan. 7, 2021

(87) PCT Pub. No.: WO2020/035455
PCT Pub. Date: Feb. 20, 2020

(65) Prior Publication Data
US 2021/0269640 A1    Sep. 2, 2021

(30) Foreign Application Priority Data

Aug. 16, 2018    (EP) .................................... 18189401

(51) Int. Cl.
| | | |
|---|---|---|
| *C08L 77/02* | (2006.01) | |
| *C08F 220/18* | (2006.01) | |
| *C08F 222/06* | (2006.01) | |
| *C08G 69/36* | (2006.01) | |
| *C08K 7/14* | (2006.01) | |
| *C08L 23/08* | (2006.01) | |
| *C08L 23/16* | (2006.01) | |
| *C08L 51/00* | (2006.01) | |
| *C08L 51/06* | (2006.01) | |
| *C08L 77/08* | (2006.01) | |

(52) U.S. Cl.
CPC ........ *C08L 77/02* (2013.01); *C08F 220/1804* (2020.02); *C08F 222/06* (2013.01); *C08G 69/36* (2013.01); *C08K 7/14* (2013.01); *C08L 23/0815* (2013.01); *C08L 23/0869* (2013.01); *C08L 23/16* (2013.01); *C08L 51/003* (2013.01); *C08L 51/06* (2013.01); *C08L 77/08* (2013.01); *C08L 2203/12* (2013.01); *C08L 2203/16* (2013.01); *C08L 2203/30* (2013.01); *C08L 2205/02* (2013.01); *C08L 2205/035* (2013.01)

(58) Field of Classification Search
CPC ............... C08L 77/08; C08L 77/00–06; C08L 2205/02; C08L 2205/025; C08L 2205/03
See application file for complete search history.

(56) References Cited

U.S. PATENT DOCUMENTS

| | | | |
|---|---|---|---|
| 3,498,941 A | 3/1970 | Hofton et al. | |
| 4,212,777 A | 7/1980 | Goletto | |
| 4,977,213 A | 12/1990 | Giroud-Abel et al. | |
| 5,256,460 A * | 10/1993 | Yu | C08L 77/02 428/36.9 |
| 5,482,997 A | 1/1996 | Debets et al. | |
| 5,602,200 A | 2/1997 | Wissmann | |
| 6,060,562 A * | 5/2000 | Guaita | C08L 23/08 525/185 |
| 2014/0303311 A1 | 10/2014 | Jain et al. | |

FOREIGN PATENT DOCUMENTS

| | | |
|---|---|---|
| CN | 103571188 A | 2/2014 |
| CN | 103814083 A | 5/2014 |
| EP | 2719729 A1 | 4/2014 |
| JP | 2000514134 A | 10/2000 |
| WO | 2005014278 A1 | 2/2005 |

OTHER PUBLICATIONS

International Search Report and Written Opinion for corresponding PCT/EP2019/071608 dated Oct. 21, 2019, 9 pages.

* cited by examiner

*Primary Examiner* — Ana L. Woodward
(74) *Attorney, Agent, or Firm* — Armstrong Teasdale LLP

(57)    ABSTRACT

Described herein is a method of using copolyamides c) produced by polymerization of components
A') 15% to 84% by weight of at least one lactam, and
B') 16% to 85% by weight of a monomer mixture (M) including components
B1') at least one $C_{32}$-$C_{40}$-dimer acid and
B2') at least one $C_4$-$C_{12}$-diamine,
where the percentages by weight of the components A') and B') are in each case based on the sum of the percentages by weight of the components A') and B'), the method including using the copolyamides c) to increase an impact strength and/or breaking elongation of molded articles made of molding materials including thermoplastic polyamides, which are different from copolyamides c).

12 Claims, No Drawings

THERMOPLASTIC MOLDING MATERIAL

CROSS-REFERENCE TO RELATED APPLICATIONS

This application is a U.S. National Phase Application of International Patent Application No. PCT/EP2019/071608, filed Aug. 12, 2019, which claims the benefit of priority to European Patent Application No. 18189401.5, filed Aug. 16, 2018, the entire contents of which are hereby incorporated by reference herein.

DESCRIPTION

The invention relates to the use of special copolyamides for increasing the impact strength and/or breaking elongation of molded articles made of thermoplastic molding materials comprising thermoplastic polyamides and to corresponding thermoplastic molding materials, to processes for the production thereof, to the use thereof and to fibers, films or molded articles made of the thermoplastic molding material.

It is known to increase the impact strength and/or breaking elongation of polyamides by mixing the polyamides with functionalized elastomers. The tensile modulus may be reduced at the same time.

U.S. Pat. No. 5,482,997 relates to polyamide compositions comprising an elastomer having polyamide-reactive groups to increase impact resistance. Employed for example is an ethylene-propylene-ethylidene-norbornene terpolymer grafted with maleic anhydride or a thermoplastic polymer, based on equal amounts of polypropylene and EPDM rubber, grafted with maleic anhydride.

U.S. Pat. No. 5,602,200 describes polyamide/polyolefin blends comprising an unmodified polypropylene or unmodified polyethylene and optionally also an ethylene-propylene-diene elastomer grafted with carboxylic acid or maleic anhydride.

WO 2005/014278 describes an adhesive polymer layer comprising polyamide, a copolymer of ethylene and an unsaturated carboxylic acid and/or a derivative thereof and a reactive copolymer. PA6 is mixed with a grafted polyethylene and a styrene-maleic anhydride copolymer for example. The polymer composition may be employed as an adhesive layer for forming metal laminates.

U.S. Pat. No. 3,498,941 A describes polymeric dispersions of PA66 and polyethylene containing a polymeric dispersant.

U.S. Pat. No. 4,212,777 A describes linear copolyamides of hexamethylene diamine, dimeric fatty acid and caprolactam.

Blends of polyamide (PA) and polyolefin elastomers (POE) exhibit improved properties in terms of hardness and stress/strain behavior. Since the compatibility of polyamide and polyolefin elastomers is limited functionalized polyolefin elastomers are often employed, for example polyolefin elastomers grafted with maleic anhydride. At larger proportions of polyolefin elastomers in the blends the compatibility cannot be further improved by grafting with maleic anhydride since the number of reactive end groups in the polyamide is limited.

It is an object of the invention to provide an additive which makes it possible to increase the impact resistance and/or breaking elongation of molded articles made of thermoplastic molding materials comprising thermoplastic polyamides, wherein the molding materials preferably further comprise at least one elastomer. It is a further object of the invention to provide corresponding thermoplastic molding materials which comprise polyamide and elastomer and have an elevated impact strength and/or breaking elongation.

The object is achieved according to the invention through the use of copolyamides c) produced by polymerization of the components A') 15% to 84% by weight of at least one lactam,
B') 16% to 85% by weight of a monomer mixture (M) comprising the components
B1') at least one $C_{32}$-$C_{40}$-dimer acid and
B2') at least one $C_4$-$C_{12}$-diamine,
wherein the percentages by weight of the components A') and B') are in each case based on the sum of the percentages by weight of the components A') and B'),
to increase the impact strength and/or breaking elongation of molded articles made of molding materials comprising thermoplastic polyamides, which are different from copolyamides c).

The thermoplastic molding materials preferably further comprise at least one elastomer selected from
b1) copolymers of ethylene with at least one comonomer selected from $C_{3-12}$-olefins, $C_{1-12}$-alkyl (meth)acrylates, (meth)acrylic acid and maleic anhydride as component B1),
b2) polyethylene or polypropylene as component B2),
wherein components B1) and B2) may also be additionally grafted with maleic anhydride.

Said object is also achieved by a thermoplastic molding material comprising
a) 38.8% to 98.8% by weight of at least one thermoplastic polyamide which is different from component c), as component A),
b) 1.0 to 50.0% by weight of at least one elastomer as component B), selected from
b1) copolymers of ethylene with at least one comonomer selected from $C_{3-12}$-olefins, $C_{1-12}$-alkyl (meth) acrylates, (meth)acrylic acid and maleic anhydride as component B1),
b2) polyethylene or polypropylene as component B2), wherein components B1) and B2) may also be additionally grafted with maleic anhydride,
c) 0.2% to 50% by weight of at least one copolyamide produced by polymerization of the components
A') 15% to 84% by weight of at least one lactam,
B') 16% to 85% by weight of a monomer mixture (M) comprising the components
B1') at least one $C_{32}$-$C_{40}$-dimer acid and
B2') at least one $C_4$-$C_{12}$-diamine,
wherein the percentages by weight of the components A') and B') are in each case based on the sum of the percentages by weight of the components A') and B'), as component C)
d) 0% to 60% by weight of glass fibers as component D),
e) 0% to 30% by weight of further additives and processing aids as component E),
wherein the percentages by weight of the components A) to E) (components D and E) if present) sum to 100% by weight.

The object is further achieved by a process for producing such a thermoplastic molding material by mixing the components A) to E).

The object is further achieved by use of the thermoplastic molding materials through production of fibers, films and molded articles, by the corresponding fibers, films or molded articles and by processes for the production thereof.

According to the invention it has been found that copolyamides c) produced by polymerization of the components A') 15% to 84% by weight of at least one lactam, B') 16% to 85% by weight of a monomer mixture (M) comprising the components B1') at least one $C_{32}$-$C_{40}$-dimer acid and B2') at least one $C_4$-$C_{12}$-diamine, wherein the percentages by weight of the components A') and B') are in each case based on the sum of the percentages by weight of the components A') and B'), result in an increase in the impact strength and/or breaking elongation of polyamide molding materials, in particular of polyamide/elastomer blends, which are different from the copolyamides c), i.e. both are different chemical compounds.

According to the invention it has been found that the copolyamide of component C) not only remains in the polyamide phase as a blend component but partially migrates into the interspace between the polyamide and elastomer domains. Accordingly, a core-shell structure is observable by TEM microscopy.

In such a core-shell structure the domains of the elastomer are at least partially surrounded by the component C) and are disposed in the polyamide matrix in this core-shell structure. The copolyamide of the component C) is typically disposed in the phase boundary with the elastomer and dispersed in the polyamide matrix.

Component A)

As component A) the thermoplastic molding materials comprise 38.8% to 98.8% by weight, by preference 47.5.0% to 97.5% by weight, preferably 44.0% to 94.0% by weight, in particular 61.0% to 63.0% by weight, of at least one thermoplastic polyamide.

The polyamides of the molding materials according to the invention generally have an intrinsic viscosity of 90 to 210 ml/g, preferably 110 to 160 ml/g, determined in a 0.5 wt % solution in 96.0% by weight sulfuric acid at 25° C. according to ISO 307.

Semicrystalline or amorphous resins having a molecular weight (weight average) of at least 5000, such as are described for example in U.S. Pat. Nos. 2,071,250, 2,071,251, 2,130,523, 2,130,948, 2,241,322, 2,312,966, 2,512,606 and 3,393,210, are preferred.

Examples thereof are polyamides which derive from lactams having 7 to 13 ring members, such as polycaprolactam, polycaprylolactam and polylaurolactam, and also polyamides obtained by reaction of dicarboxylic acids with diamines.

Employable dicarboxylic acids include alkanedicarboxylic acids having 6 to 12 carbon atoms, in particular 6 to 10 carbon atoms, and aromatic dicarboxylic acids. These only include the acids adipic acid, azelaic acid, sebacic acid, dodecanedioic acid and terephthalic and/or isophthalic acid.

Particularly suitable diamines include alkanediamines having 6 to 12, in particular 6 to 9, carbon atoms and m-xylylenediamine, di(4-aminophenyl)methane, di(4-aminocyclohexyl)methane, 2,2-di(4-aminophenyl)propane, 2,2-di(4-aminocyclohexyl)propane or 1,5-diamino-2-methylpentane.

Preferred polyamides are polyhexamethylene adipamide, polyhexamethylene sebacamide, polycaprolactam and copolyamide 6/66, in particular having a proportion of 5% to 95.0% by weight of caprolactam units.

Suitable polyamides further include those obtainable from ω-aminoalkylnitriles such as for example aminocapronitrile (PA 6) and adipodinitrile with hexamethylenediamine (PA 66) by so-called direct polymerization in the presence of water, as described for example in DE-A10313681, EP-A-1 198 491 and EP 9 220 65.

Also suitable are polyamides obtainable for example by condensation of 1,4-diaminobutane with adipic acid at elevated temperature (polyamide 4,6). Production processes for polyamides having this structure are described for example in EP-A-38 094, EP-A-38 582 and EP-A-039 524.

Also suitable are polyamides obtainable by copolymerization of two or more of the abovementioned monomers or mixtures of a plurality of polyamides in any desired mixing ratio.

Suitable polyamides preferably have a melting point of less than 265° C.

The following nonexhaustive list includes the recited polyamides and also further polyamides within the meaning of the invention as well as the monomers present.

AB Polymers:

PA 4 pyrrolidone

PA 6 ε-caprolactam

PA 7 ethanolactam

PA 8 caprylolactam

PA 9 9-aminopelargonic acid

PA 11 11-aminoundecanoic acid

PA 12 laurolactam

AA/BB Polymers:

PA 46 tetramethylenediamine, adipic acid

PA 66 hexamethylenediamine, adipic acid

PA 69 hexamethylenediamine, azelaic acid

PA 610 hexamethylenediamine, sebacic acid

PA 612 hexamethylenediamine, decanedicarboxylic acid

PA 613 hexamethylenediamine, undecanedicarboxylic acid

PA 1212 1,12-dodecanediamine, decanedicarboxylic acid

PA 1313 1,13-diaminotridecane, undecanedicarboxylic acid

PA 6T hexamethylenediamine, terephthalic acid

PA MXD6 m-xylylenediamine, adipic acid

PA 9T nonamethylenediamine, terephthalic acid

AA/BB Polymers:

PA6I hexamethylenediamine, isophthalic acid

PA 6-3-T trimethylhexamethylenediamine, terephthalic acid

PA 6/6T (see PA 6 and PA 6T)

PA 6/66 (see PA 6 and PA 66)

PA 6/12 (see PA 6 and PA 12)

PA 66/6/610 (see PA 66, PA 6 and PA 610)

PA 6I/6T (see PA 6I and PA 6T)

PAPACM 12 diaminodicyclohexylmethane, laurolactam

PA 6I/6T/PACMT as per PA 6I/6T+diaminodicyclohexylmethane, terephthalic acid

PA 6T/6I/MACMT as per PA 6I/6T+dimethyldiaminocyclohexylmethane, terephthalic acid PA 6T/6I/MXDT as per PA 6I/6T+m-xylylenediamine, terephthalic acid PA 12/MACMI laurolactam, dimethyldiaminodicyclohexylmethane, isophthalic acid PA 12/MACMT laurolactam, dimethyldiaminodicyclohexylmethane, terephthalic acid PA PDA-T phenylenediamine, terephthalic acid PA 6T6I (see PA 6T and PA 6I)

PA 6T66 (see PA 6T and PA 66)

Component A) may be a blend of at least one aliphatic polyamide and at least one semiaromatic or aromatic polyamide.

Employed according to the invention as component A) for example are mixtures comprising polyamide 6 and polyamide 6.6 and optionally also polyamide 6I/6T. It is preferable to employ a majority of polyamide 6.6. The amount of polyamide 6 is preferably 5.0 to 50.0 wt %, particularly preferably 10.0 to 30.0 wt %, based on the amount of polyamide 6.6. In the event of co-use of polyamide 6I/6T the proportion thereof is preferably 10.0 to 25.0 wt %, particularly preferably 0.0 to 25.0 wt %, based on the amount of polyamide 6.6.

In place of or in addition to polyamide 6I/6T it is also possible to employ polyamide 6I or polyamide 6T or mixtures thereof.

Employed according to the invention in particular are polyamide 6, polyamide 66 and copolymers or mixtures thereof. The polyamide 6 or polyamide 66 preferably has a viscosity number of in the range from 80 to 180 ml/g, in particular 85 to 160 ml/g, in particular 90 to 140 ml/g, determined in a 0.5% by weight solution in 96% by weight sulfuric acid at 25° C. according to ISO 307.

A suitable polyamide 66 preferably has a viscosity number in the range from 110 to 170 ml/g, particularly preferably 130 to 160 ml/g.

For suitable semicrystalline and amorphous polyamides reference may further be made to DE 10 2005 049 297. They have a viscosity number of 90 to 210 ml/g, preferably 110 to 160 ml/g, determined in a 0.5% by weight solution in 96% by weight sulfuric acid at 25° C. according to ISO 307.

In the polyamide 6 or polyamide 66 0% to 10% by weight, preferably 0% to 5% by weight, may be replaced by semiaromatic polyamides. It is particularly preferable when no semiaromatic polyamides are co-used.

Component B)

As component B) the thermoplastic molding materials comprise 0.0% to 50% by weight, preferably 2% to 40% by weight, particularly preferably 5% to 40% by weight, of at least one elastomer. Also contemplated are preferred amounts of 2% to 20% by weight and particularly preferred amounts of 5% to 10% by weight.

Component B), the elastomer, is selected from
b1) copolymers of ethylene with at least one comonomer selected from $C_{3-12}$-olefins, $C_{1-12}$-alkyl (meth)acrylates, (meth)acrylic acid, maleic anhydride, as component B1),
b2) polyethylene or polypropylene as component B2),
wherein components B1) and B2) may also be additionally grafted with maleic anhydride.

Component B1) may comprise one or more different comonomers, preferably 1 to 3 different copolymers, particularly preferably one or two different comonomers. The $C_{3-12}$-olefins are preferably terminal, linear $C_{3-12}$-olefins, particularly preferably $C_{3-8}$-olefins. Examples of suitable olefins are propylene, 1-butene, 1-pentene, 1-hexene, 1-heptene and 1-octene.

According to one embodiment, component B) is not polyethylene. According to one embodiment of the invention, component B2) is not polyethylene. However, in this embodiment, component B2) can be polyethylene grafted with maleic anhydride. It is also possible to employ mixtures of polyethylene with the other elastomers mentioned as components B1) and B2).

The $C_{1-12}$-alkyl (meth)acrylates comprise $C_{1-12}$-alkyl radicals, preferably $C_{2-6}$-alkyl radicals, such as methyl, ethyl, propyl, butyl, pentyl, hexyl, ethylhexyl radicals. Alkyl acrylates are preferably concerned.

In the copolymers of component B1) the proportion of ethylene base units is preferably 1% to 99% by weight, particularly preferably 60% to 98% by weight, especially preferably 84% to 96% by weight.

The following preferred amounts apply for the comonomers:
$C_{3-12}$-olefins: preferably 99% to 1% by weight, particularly preferably 40% to 10% by weight,
$C_{1-12}$-alkyl (meth)acrylates: preferably 40% to 2% by weight, particularly preferably 30% to 5% by weight,
(Meth)acrylic acid: preferably 40% to 2% by weight, particularly preferably 30% to 5% by weight,
Maleic anhydride: preferably 3% to 0.01% by weight, particularly preferably 2% to 0.1% by weight, The total amount of comonomers is preferably in the range from 1% to 99% by weight, particularly preferably 2% to 40% by weight.

The copolymers of component B1) may be random or block copolymers. The former consist of a crystallizing and thus physically crosslinking main polymer (polyethylene) whose degree of crystallization is reduced by a comonomer randomly incorporated along the chain so that the crystallites in the finished molding material are no longer in direct contact. They then act as insulated crosslinking points as in conventional elastomers.

In block copolymers the hard and soft segments in a molecule are highly distinct. In thermoplastic elastomers the material demixes into a continuous phase and a discontinuous phase below a certain temperature. As soon as the latter falls below its glass temperature it in turn acts as a crosslinking point.

The copolymer of component B1) may also be grafted with maleic anhydride. The maleic anhydride used for the grafting is preferably employed in an amount of 5% to 0.005% by weight, particularly preferably 3% to 0.01% by weight, based on the copolymer of the component B1). In the grafted copolymer of the component B1) the maleic anhydride proportion is preferably in the range from 2% to 0.1% by weight based on the ungrafted copolymer of the component B1).

Component B1) preferably has a melt flow index (MVR) (190° C./2.16 kg, according to ISO1133) value of 0.1 to 20 $cm^3$/10 min, particularly preferably 0.1 to 15 $cm^3$/10 min.

Employable alternatively or in addition to the component B1) as component B2) is polyethylene or polypropylene or a mixture of both. This component B2) may also be grafted with maleic anhydride, wherein the proportion of maleic anhydride based on the polyolefin is 5% to 0.005% by weight, particularly preferably 2% to 0.1% by weight.

Component B2) preferably has an MVR (190° C./2.16 kg, according to ISO 1133) value of 0.1 to 20 $cm^3$/10 min, particularly preferably 0.1 to 15 $cm^3$/10 min.

The term "elastomer" describes the components B1) and B2) which may optionally be grafted with maleic anhydride. Thermoplastic elastomers (TPE) may preferably be concerned. At room temperature TPE exhibit behavior comparable to the classical elastomers but are plastically deformable when heated and thus exhibit thermoplastic behavior.

Also employable according to the invention are mixtures of the components B1) and B2). These are in particular elastomer alloys (polyblends).

The thermoplastic elastomers are usually copolymers comprising a "soft" elastomer component and a "hard" thermoplastic component. Their properties are thus between those of elastomers and thermoplastics.

Polyolefin elastomers (POE) are polymerized for example through the use of metallocene catalysts, examples including ethylene-propylene elastomers (EPR or EPDM).

The most common polyolefin elastomers are copolymers of ethylene and butene or ethylene and octene.

For further description of the elastomers suitable as component C) reference may also be made to U.S. Pat. Nos. 5,482,997, 5,602,200, 4,174,358 and WO 2005/014278 A1.

Examples of suitable elastomers are obtainable for example from lyondellbasell under the designations Lucalen A2540D and Lucalen A2700M. Lucalen A2540D is a low density polyethylene comprising a butyl acrylate comonomer. It has a density of 0.923 g/cm$^3$ and a Vicat softening temperature of 85° C. at a butyl acrylate proportion of 6.5% by weight.

Lucalen A2700M is a low density polyethylene likewise comprising a butyl acrylate comonomer. It has a density of 0.924 g/cm$^3$, a Vicat softening temperature of 60° C. and a melting temperature of 95° C.

The polymer resin Exxelor® VA 1801 from ExxonMobil is a semicrystalline ethylene copolymer functionalized with maleic anhydride by reactive extrusion and having an intermediate viscosity. First polymer backbone is fully saturated. The density is 0.880 g/cm$^3$ and the proportion of maleic anhydride is typically in the range from 0.5% to 1.0% by weight.

Further suitable components B) are known to those skilled in the art.

Component C)

As component C) the thermoplastic molding materials comprise 0.2% to 50% by weight or 0.3% to 40% by weight, preferably 0.5% to 25% by weight, in particular 1% to 10% by weight, of at least one copolyamide produced by polymerization of the components A') 15% to 84% by weight of at least one lactam,
B') 16% to 85% by weight of a monomer mixture (M) comprising the components
B1') at least one $C_{32}$-$C_{40}$-dimer acid and
B2') at least one $C_4$-$C_{12}$-diamine,
wherein the percentages by weight of the components A') and B') are in each case based on the sum of the percentages by weight of the components A') and B').

In the context of the present invention the terms "component A')" and "at least one lactam" are used synonymously and therefore have the same meaning.

The same applies for the terms "component B')" and "monomer mixture (M)". These terms are likewise used synonymously in the context of the present invention and therefore have the same meaning.

According to the invention the at least one copolyamide is produced by polymerization of 15% to 84% by weight of the component A') and 16% to 85% by weight of the component B'), preferably by polymerization of 40% to 83% by weight of the component A') and 17% to 60% by weight of the component B') and especially preferably by polymerization of 60% to 80% by weight of the component A') and 20% to 40% by weight of the component B'), wherein the percentages by weight of the components A') and B') are in each based on the sum of the percentages by weight of the components A') and B').

The sum of the percentages by weight of the components A') and B') is preferably 100% by weight.

It will be appreciated that the weight percentages of the components A') and B') relate to the weight percentages of the components A') and B') prior to the polymerization, i.e. when the components A') and B') have not yet reacted with one another. During the polymerization of the components A') and B') the weight ratio of the components A') and B') may optionally change.

According to the invention the at least one copolyamide is produced by polymerization of the components A') and B'). The polymerization of the components A') and B') is known to those skilled in the art. The polymerization of the components A') with B') is typically a condensation reaction. During the condensation reaction the component A') reacts with the components B1') and B2') present in the component B') and optionally with the component B3') described hereinbelow which may likewise be present in the component B'). This causes amide bonds to form between the individual components. During the polymerization the component A') is typically at least partially in open chain form, i.e. in the form of an amino acid.

The polymerization of the components A') and B') may take place in the presence of a catalyst. Suitable catalysts include all catalysts known to those skilled in the art which catalyze the polymerization of the components A') and B'). Such catalysts are known to those skilled in the art. Preferred catalysts are phosphorus compounds, for example sodium hypophosphite, phosphorous acid, triphenylphosphine or triphenyl phosphite.

The polymerization of the components A') and B') forms the at least one copolyamide which therefore comprises units derived from the component A') and units derived from the component B'). Units derived from the component B') comprise units derived from the components B1') and B2') and optionally from the component B3').

The polymerization of the components A') and B') forms the copolyamide as a copolymer. The copolymer may be a random copolymer. It may likewise be a block copolymer.

Formed in a block copolymer are blocks of units derived from the component B') and blocks of units derived from the component A'). These appear in alternating sequence. In a random copolymer units derived from the component A') alternate with units derived from the component B'). This alternation is random. For example two units derived from the component B') may be followed by one unit derived from the component A') which is followed in turn by a unit derived from the component B') and then by a unit comprising three units derived from the component A').

It is preferable when the at least one copolyamide is a random copolymer.

Production of the at least one copolyamide preferably comprises steps of:

I) polymerizing the components A') and B') to obtain at least a first copolyamide,
II) pelletizing the at least one first copolyamide obtained in step I) to obtain at least one pelletized copolyamide,
III) extracting the at least one pelletized copolyamide obtained in step II) with water to obtain at least one extracted copolyamide,
IV) drying the at least one extracted copolyamide obtained in step III) at a temperature (TT) to obtain the at least one copolyamide,
IV) drying the at least one extracted copolyamide obtained in step III) at a temperature (TT) to obtain the at least one copolyamide.

The polymerization in step I) may be carried out in any reactor known to those skilled in the art. Preference is given to stirred tank reactors. It is also possible to use auxiliaries known to those skilled in the art, for example defoamers such as polydimethylsiloxane (PDMS), to improve reaction management.

In step II) the at least one first copolyamide obtained in step I) may be pelletized by any methods known to those skilled in the art, for example by strand pelletization or underwater pelletization.

The extraction in step III) may be effected by any methods known to those skilled in the art.

During the extraction in step III) byproducts typically formed during the polymerization of the components A') and B') in step I) are extracted from the at least one pelletized copolyamide.

In step IV) the at least one extracted copolyamide obtained in step III) is dried. Processes for drying are known to those skilled in the art. According to the invention the at least one extracted copolyamide is dried at a temperature ($T_T$). The temperature ($T_T$) is preferably above the glass transition temperature ($T_{G(C)}$) of the at least one copolyamide and below the melting temperature ($T_{M(C)}$) of the at least one copolyamide.

The drying in step IV) is typically carried out for a period in the range from 1 to 100 hours, preferably in the range from 2 to 50 hours and especially preferably in the range from 3 to 40 hours.

It is thought that the drying in step IV) further increases the molecular weight of the at least one copolyamide.

The at least one copolyamide typically has a glass transition temperature ($T_{G(C)}$). The glass transition temperature ($T_{G(C)}$) is for example in the range from 20° C. to 50° C., preferably in the range from 23° C. to 47° C. and especially preferably in the range from 25° C. to 45° C. determined according to ISO 11357-2:2014.

In the context of the present invention the glass transition temperature ($T_{G(C)}$) of the at least one copolyamide is based, in accordance with ISO 11357-2:2014, on the glass transition temperature ($T_{G(C)}$) of the dry copolyamide.

In the context of the present invention "dry" is to be understood as meaning that the at least one copolyamide comprises less than 1% by weight, preferably less than 0.5% by weight and especially preferably less than 0.1% by weight of water based on the total weight of the at least one copolyamide. "Dry" is more preferably to be understood as meaning that the at least one copolyamide comprises no water and most preferably that the at least one copolyamide comprises no solvent.

In addition, the at least one copolyamide typically has a melting temperature ($T_{M(C)}$). The melting temperature ($T_{M(C)}$) of the at least one copolyamide is, for example, in the range from 150 to 210° C., preferably in the range from 160 to 205° C. and especially preferably in the range from 160 to 200° C. determined according to ISO 11357-3:2014.

The at least one copolyamide generally has a viscosity number ($V_{N(C)}$) in the range from 150 to 300 mL/g determined in a 0.5% by weight solution of the at least one copolyamide in a mixture of phenol/o-dichlorobenzene in a weight ratio of 1:1.

It is preferable when the viscosity number ($V_{N(C)}$) of the at least one copolyamide is in the range from 160 to 290 mL/g and particularly preferably in the range from 170 to 280 mL/g determined in a 0.5% by weight solution of the at least one copolyamide in a mixture of phenol/o-dichlorobenzene in a weight ratio of 1:1.

Component A')

According to the invention the component A') is at least one lactam.

In the context of the present invention "at least one lactam" is understood as meaning either precisely one lactam or a mixture of 2 or more lactams.

Lactams are known per se to those skilled in the art. Preferred according to the invention are lactams having 4 to 12 carbon atoms.

In the context of the present invention "lactams" are to be understood as meaning cyclic amides having preferably 4 to 12 carbon atoms, particularly preferably 5 to 8 carbon atoms, in the ring.

Suitable lactams are for example selected from the group consisting of 3-aminopropanolactam (propio-3-lactam; β-lactam; β-propiolactam), 4-aminobutanolactam (butyro-4-lactam; γ-lactam; γ-butyrolactam), aminopentanolactam (2-piperidinone; δ-lactam; δ-valerolactam), 6-aminohexanolactam (hexano-6-lactam; ε-lactam; ε-caprolactam), 7-aminoheptanolactam (heptano-7-lactam; ζ-lactam; ζ-heptanolactam), 8-aminooctanolactam (octano-8-lactam; η-lactam; η-octanolactam), 9-aminononanolactam (nonano-9-lactam; θ-lactam; θ-nonanolactam), 10-aminodecanolactam (decano-10-lactam; ω-decanolactam), 11-aminoundecanolactam (undecano-11-lactam; ω-undecanolactam) and 12-aminododecanolactam (dodecano-12-lactam; ω-dodecanolactam).

The present invention therefore also provides a process where the component A') is selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam and 12-aminododecanolactam.

The lactams may be unsubstituted or at least monosubstituted. If at least monosubstituted lactams are used, the nitrogen atom and/or the ring carbon atoms thereof may bear one, two, or more substituents selected independently of one another from the group consisting of $C_1$- to $C_{10}$-alkyl, $C_5$- to $C_6$-cycloalkyl, and $C_5$- to $C_{10}$-aryl.

Suitable $C_1$- to $C_{10}$-alkyl substituents are, for example, methyl, ethyl, propyl, isopropyl, n-butyl, sec-butyl, and tert-butyl. A suitable $C_5$- to $C_6$-cycloalkyl substituent is for example cyclohexyl. Preferred $C_5$- to $C_{10}$-aryl substituents are phenyl or anthranyl.

It is preferable to employ unsubstituted lactams, γ-lactam (γ-butyrolactam), δ-lactam (δ-valerolactam) and ε-lactam (ε-caprolactam) being preferred. Particular preference is given to δ-lactam (δ-valerolactam) and ε-lactam (ε-caprolactam), ε-caprolactam being especially preferred.

Monomer Mixture (M)

According to the invention the component B') is a monomer mixture (M). The monomer mixture (M) comprises the components B1'), at least one $C_{32}$-$C_{40}$-dimer acid, and B2'), at least one $C_4$-$C_{12}$-diamine.

In the context of the present invention a monomer mixture (M) is to be understood as meaning a mixture of two or more monomers, wherein at least components B1') and B2') are present in the monomer mixture (M).

In the context of the present invention the terms "component B11')" and "at least one $C_{32}$-$C_{40}$-dimer acid" are used synonymously and therefore have the same meaning. The same applies for the terms "component B2')" and "at least one $C_4$-$C_{12}$-diamine". These terms are likewise used synonymously in the context of the present invention and therefore have the same meaning.

The monomer mixture (M) comprises, for example, in the range from 45 to 55 mol % of the component B1') and in the range from 45 to 55 mol % of the component B2') in each case based on the sum of the mole percentages of the components B1') and B2'), preferably based on the total amount of substance of the monomer mixture (M).

It is preferable when the component B') comprises in the range from 47 to 53 mol % of component B1') and in the range from 47 to 53 mol % of component B2') in each case based on the sum of the mole percentages of the components B1') and B2'), preferably based on the total amount of substance of the component B').

It is particularly preferable when the component B') comprises in the range from 49 to 51 mol % of the component B1') and in the range from 49 to 51 mol % of the component B2') in each case based on the sum total of the mole percentages of the components B1') and B2'), preferably based on the total amount of substance of the component B').

The mole percentages of the components B1') and B2') present in the component B') typically sum to 100 mol %.

The component B') may additionally comprise a component B3'), at least one $C_4$-$C_{20}$-diacid.

In the context of the present invention, the terms "component B3')" and "at least one $C_4$-$C_{20}$-diacid" are used synonymously and therefore have the same meaning.

When the component B') additionally comprises the component B3') it is preferable when component B') comprises in the range from 25 to 54.9 mol % of the component B1'), in the range from 45 to 55 mol % of the component B2') and in the range from 0.1 to 25 mol % of the component B3') in each case based on the total amount of substance of the component B').

It is particularly preferable when the component B') then comprises in the range from 13 to 52.9 mol % of the component B11'), in the range from 47 to 53 mol % of the component B2') and in the range from 0.1 to 13 mol % of the component B3') in each case based on the total amount of substance of the component B').

It is most preferable when the component B') then comprises in the range from 7 to 50.9 mol % of the component B1'), in the range from 49 to 51 mol % of the component B2') and in the range from 0.1 to 7 mol % of the component B3') in each case based on the total amount of substance of the component B').

When component B') additionally comprises the component B3') the mole percentages of the components B1'), B2') and B3') typically sum to 100 mol %.

The monomer mixture (M) may further comprise water.

The components B1') and B2') and optionally B3') of the component B') can react with one another to obtain amides. This reaction is known per se to those skilled in the art. The component B') may therefore comprise components B1'), B2') and optionally B3') in fully reacted form, in partially reacted form or in unreacted form. It is preferable when the component B') comprises the components B1'), B2') and optionally B3') in unreacted form.

In the context of the present invention "in unreacted form" is thus to be understood as meaning that the component B1') is present as the at least one $C_{32}$-$C_{40}$-dimer acid and the component B2') is present as the at least one $C_4$-$C_{12}$-diamine and optionally the component B3') is present as the at least one $C_4$-$C_{20}$-diacid.

If the components B1') and B2') and optionally B3') have at least partly reacted the components B1') and B2') and any B3') are thus at least partially in amide form.

Component B1')

According to the invention the component B1') is at least one $C_{32}$-$C_{40}$-dimer acid.

In the context of the present invention "at least one $C_{32}$-$C_{40}$-dimer acid" is to be understood as meaning either precisely one $C_{32}$-$C_{40}$-dimer acid or a mixture of two or more $C_{32}$-$C_{40}$-dimer acids.

Dimer acids are also referred to as dimer fatty acids. $C_{32}$-$C_{40}$-dimer acids are known per se to those skilled in the art and are typically produced by dimerization of unsaturated fatty acids. This dimerization may be catalyzed by argillaceous earths for example.

Suitable unsaturated fatty acids for producing the at least one $C_{32}$-$C_{40}$-dimer acid are known to those skilled in the art and are for example unsaturated $C_{16}$-fatty acids, unsaturated $C_{18}$-fatty acids and unsaturated $C_{20}$-fatty acids.

It is therefore preferable when the component B1') is produced from unsaturated fatty acids selected from the group consisting of unsaturated $C_{16}$-fatty acids, unsaturated $C_{18}$-fatty acids and unsaturated $C_{20}$-fatty acids, wherein the unsaturated $C_{18}$-fatty acids are particularly preferred.

A suitable unsaturated $C_{16}$-fatty acid is palmitoleic acid ((9Z)-hexadeca-9-enoic acid) for example.

Suitable unsaturated $C_{18}$-fatty acids are for example selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z,12Z)-octadeca-9,12-dienoic acid), α-linolenic acid ((9Z,12Z,15Z)-octadeca-9,12,15-trienoic acid), γ-linolenic acid ((6Z,9Z,12Z)-octadeca-6,9,12-trienoic acid), calendulic acid ((8E,10E,12Z)-octadeca-8,10,12-trienoic acid), punicic acid ((9Z,11E,13Z)-octadeca-9,11,13-trienoic acid), α-eleostearic acid ((9Z,11E,13E)-octadeca-9,11,13-trienoic acid) and β-eleostearic acid ((9E,11E,13E)-octadeca-9,11,13-trienoic acid). Particular preference is given to unsaturated $C_{18}$-fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid), linoleic acid ((9Z,12Z)-octadeca-9,12-dienoic acid).

Suitable unsaturated $C_{20}$-fatty acids are for example selected from the group consisting of gadoleic acid ((9Z)-eicosa-9-enoic acid), ecosenoic acid ((11Z)-eicosa-11-enoic acid), arachidonic acid ((5Z,8Z,11Z,14Z)-eicosa-5,8,11,14-tetraenoic acid) and timnodonic acid ((5Z,8Z,11Z,14Z,17Z)-eicosa-5,8,11,14,17-pentaenoic acid).

The component B1') is especially preferably at least one $C_{36}$-dimer acid.

The at least one $C_{36}$-dimer acid is preferably produced from unsaturated $C_{18}$-fatty acids. It is particularly preferable when the $C_{36}$-dimer acid is produced from $C_{18}$-fatty acids selected from the group consisting of petroselic acid ((6Z)-octadeca-6-enoic acid), oleic acid ((9Z)-octadeca-9-enoic acid), elaidic acid ((9E)-octadeca-9-enoic acid), vaccenic acid ((11E)-octadeca-11-enoic acid) and linoleic acid ((9Z,12Z)-octadeca-9,12-dienoic acid).

Production of the component B1') from unsaturated fatty acids may also form trimer acids and residues of unconverted unsaturated fatty acid may also remain.

The formation of trimer acids is known to those skilled in the art.

According to the invention the component B1') preferably comprises not more than 0.5% by weight of unreacted unsaturated fatty acid and not more than 0.5% by weight of trimer acid, particularly preferably not more than 0.2% by weight of unreacted unsaturated fatty acid and not more than 0.2% by weight of trimer acid, in each case based on the total weight of component B1').

Dimer acids (also known as dimerized fatty acids or dimer fatty acids) are thus to be understood as meaning generally, and especially in the context of the present invention, mixtures produced by oligomerization of unsaturated fatty acids. They are producible for example by catalytic dimerization of plant-derived unsaturated fatty acids, wherein the starting materials employed are in particular unsaturated $C_{16}$- to $C_{20}$-fatty acids. The bonding proceeds primarily by the Diels-Alder mechanism, and results, depending on the number and position of the double bonds in the fatty acids used to produce the dimer acids, in mixtures of primarily dimeric products having cycloaliphatic, linear aliphatic, branched aliphatic, and also $C_6$-aromatic hydrocarbon groups between the carboxyl groups. Depending on the mechanism and/or any subsequent hydrogenation, the aliphatic radicals may be saturated or unsaturated and the proportion of aromatic groups may also vary. The radicals between the carboxylic acid groups then comprise 32 to 40 carbon atoms for example. Production preferably employs fatty acids having 18 carbon atoms so that the dimeric product thus has 36 carbon atoms. The radicals which join the carboxyl groups of the dimer fatty acids preferably comprise no unsaturated bonds and no aromatic hydrocarbon radicals.

In the context of the present invention production thus preferably employs $C_{18}$-fatty acids. It is particularly preferable to employ linolenic, linoleic and/or oleic acid.

Depending on reaction management the above described oligomerization affords mixtures which comprise primarily dimeric, but also trimeric, molecules and also monomeric molecules and other by-products. Purification by distillation is customary. Commercial dimer acids generally comprise at least 80% by weight of dimeric molecules, up to 19% by weight of trimeric molecules, and at most 1% by weight of monomeric molecules and of other by-products.

It is preferable to use dimer acids that consist to an extent of at least 90% by weight, preferably to an extent of at least 95% by weight, very particularly preferably to an extent of at least 98% by weight, of dimeric fatty acid molecules.

The proportions of monomeric, dimeric, and trimeric molecules and of other by-products in the dimer acids may be determined by gas chromatography (GC), for example. The dimer acids are converted to the corresponding methyl esters by the boron trifluoride method (cf. DIN EN ISO 5509) before GC analysis and then analyzed by GC.

In the context of the present invention it is thus a fundamental feature of "dimer acids" that production thereof comprises oligomerization of unsaturated fatty acids. This oligomerization forms predominantly, i.e. preferably to an extent of at least 80% by weight, particularly preferably at least 90% by weight, very particularly preferably at least 95% by weight and in particular at least 98% by weight, dimeric products. The fact that the oligomerization thus forms predominantly dimeric products comprising precisely two fatty acid molecules justifies this designation which is in any case commonplace. An alternative expression for the relevant term "dimer acids" is thus "mixture comprising dimerized fatty acids".

The dimer acids to be used are obtainable as commercial products. Examples include Radiacid 0970, Radiacid 0971, Radiacid 0972, Radiacid 0975, Radiacid 0976, and Radiacid 0977 from Oleon, Pripol 1006, Pripol 1009, Pripol 1012, and Pripol 1013 from Croda, Empol 1008, Empol 1012, Empol 1061, and Empol 1062 from BASF SE, and Unidyme 10 and Unidyme TI from Arizona Chemical.

The component B1') has an acid number in the range from 190 to 200 mg KOH/g for example.

Component B2')

According to the invention the component B2') is at least one $C_4$-$C_{12}$-diamine.

In the context of the present invention "at least one $C_4$-$C_{12}$-diamine" is to be understood as meaning either precisely one $C_4$-$C_{12}$-diamine or a mixture of two or more $C_4$-$C_{12}$-diamines.

In the context of the present compound, "$C_4$-$C_{12}$-diamine" is to be understood as meaning aliphatic and/or aromatic compounds having four to twelve carbon atoms and two amino groups ($NH_2$ groups). The aliphatic and/or aromatic compounds may be unsubstituted or additionally at least monosubstituted. If the aliphatic and/or aromatic compounds are additionally at least monosubstituted, they may bear one, two or more substituents that do not take part in the polymerization of the components A') and B'). Such substituents are for example alkyl or cycloalkyl substituents. These are known per se to those skilled in the art. The at least one $C_4$-$C_{12}$-diamine is preferably unsubstituted.

Suitable components B2') are for example selected from the group consisting of 1,4-diaminobutane (butane-1,4-diamine; tetramethylenediamine; putrescine), 1,5-diaminopentane (pentamethylenediamine; pentane-1,5-diamine; cadaverine), 1,6-diaminohexane (hexamethylenediamine; hexane-1,6-diamine), 1,7-diaminoheptane, 1,8-diaminooctane, 1,9-diaminononane, 1,10-diaminodecane (decamethylenediamine), 1,11-diaminoundecane (undecamethylenediamine) and 1,12-diaminododecane (dodecamethylenediamine).

It is preferable when the component B2') is selected from the group consisting of tetramethylenediamine, pentamethylenediamine, hexamethylenediamine, decamethylenediamine and dodecamethylenediamine.

Component B3')

According to the invention the component B3') optionally present in the component B') is at least one $C_4$-$C_{20}$-diacid.

In the context of the present invention, "at least one $C_4$-$C_{20}$-diacid" is to be understood as meaning either precisely one $C_4$-$C_{20}$-diacid or a mixture of two or more $C_4$-$C_{20}$-diacids.

In the context of the present invention "$C_4$-$C_{20}$-diacid" is to be understood as meaning aliphatic and/or aromatic compounds having two to eighteen carbon atoms and two carboxyl groups (COOH groups). The aliphatic and/or aromatic compounds may be unsubstituted or additionally at least monosubstituted. If the aliphatic and/or aromatic compounds are additionally at least monosubstituted, they may bear one, two or more substituents that do not take part in the polymerization of components A') and B'). Such substituents are for example alkyl or cycloalkyl substituents. These are known to those skilled in the art. Preferably, the at least one $C_4$-$C_{20}$-diacid is unsubstituted.

Suitable components B3') are for example selected from the group consisting of butanedioic acid (succinic acid), pentanedioic acid (glutaric acid), hexanedioic acid (adipic acid), heptanedioic acid (pimelic acid), octanedioic acid (suberic acid), nonanedioic acid (azelaic acid), decanedioic acid (sebacic acid), undecanedioic acid, dodecanedioic acid, tridecanedioic acid, tetradecanedioic acid and hexadecanedioic acid.

It is preferable when the component B3') is selected from the group consisting of pentanedioic acid (glutaric acid), hexanedioic acid (adipic acid), decanedioic acid (sebacic acid) and dodecanedioic acid.

It is particularly preferable when the component C) is PA6/6.36, preferably having a melting point of 190 to 210° C., specifically having a melting point of 195 to 200° C., more specifically 196 to 199° C., and/or a (polymerized) caprolactam content of 60 to 80 wt %, more preferably 65 to 75 wt %, specifically 67 to 70 wt %, the remainder being PA 6.36 units derived from hexamethylene diamine and $C_{36}$-diacid.

Component D)

As component D) the thermoplastic molding materials comprise 0% to 60% by weight, preferably 0% to 50% by weight, of glass fibers.

As component D) the molding material according to the invention comprises for example 10% to 60% by weight or 15% to 55% by weight or 20% to 50% by weight of glass fibers (wherein the amount of the component A in these examples is adapted accordingly). If no glass fibers are used preferred ranges are from 0% to 50% by weight.

Specifically, chopped glass fibers are used. The component D) in particular comprises glass fibers, it being preferable to employ short fibers. These preferably have a length in the range from 2 to 50 mm and a diameter of 5 to 40 µm. It is alternatively possible to use continuous fibers (rovings). Suitable fibers include those having a circular and/or noncircular cross-sectional area, wherein in the latter case the dimensional ratio of the main cross-sectional axis to the secondary cross-sectional axis is especially >2, preferably in the range from 2 to 8 and particularly preferably in the range from 3 to 5.

In a specific embodiment the component D) comprises so-called "flat glass fibers". These specifically have an oval or elliptical cross-sectional area or a necked elliptical (so-called "cocoon" fibers) or rectangular or virtually rectangular cross-sectional area. Preference is given here to using glass fibers with a noncircular cross-sectional area and a dimensional ratio of the main cross-sectional axis to the secondary cross-sectional axis of more than 2, preferably of 2 to 8, in particular of 3 to 5.

Reinforcement of the molding materials according to the invention may also be effected using mixtures of glass fibers having circular and noncircular cross sections. In a specific embodiment the proportion of flat glass fibers, as defined above, predominates, i.e. they account for more than 50% by weight of the total mass of the fibers.

When rovings of glass fibers are used as component D) said fibers preferably have a diameter of 10 to 20 µm, preferably of 12 to 18 µm. The cross section of these glass fibers may be round, oval, elliptical, virtually rectangular or rectangular. Particular preference is given to what are called flat glass fibers having a ratio of the cross-sectional axes of 2 to 5. E glass fibers are used in particular. However, it is also possible to use any other glass fiber types, for example A, C, D, M, S or R glass fibers, or any desired mixtures thereof or mixtures with E glass fibers.

The polyamide molding materials according to the invention can be produced by the known processes for producing long fiber-reinforced rod pellets, especially by pultrusion processes, in which the continuous fiber strand (roving) is fully saturated with the polymer melt and then cooled and chopped. The long fiber-reinforced rod pellets obtained in this manner, which preferably have a pellet length of 3 to 25 mm, especially of 4 to 12 mm, may be processed further to afford moldings by the customary processing methods, for example injection molding or press molding.

Component E)

As component E) the compositions according to the invention comprise 0% to 30% by weight, preferably 0% to 20% by weight and in particular 0% to 10% by weight of further additives. In the event of co-use of such additives the minimum amount is 0.1% by weight, preferably 1% by weight, in particular 3% by weight.

In the event of co-use of component E) the upper limit for the component A is reduced correspondingly. Thus, at a minimum amount of 0.1% by weight of the component E) the upper limit for the amount of component A is 99.87% by weight.

Contemplated further additives include fillers and reinforcers distinct from glass fibers, thermoplastic polymers distinct from component A or other additives.

In the context of the invention the term "filler and reinforcer" (=possible component E)) is to be interpreted broadly and comprises particulate fillers, fibrous substances and any intermediate forms. Particulate fillers may have a wide range of particle sizes ranging from particles in the form of dusts to large grains. Useful filler materials include organic or inorganic fillers and reinforcers. Employable here are for example inorganic fillers, such as kaolin, chalk, wollastonite, talc, calcium carbonate, silicates, titanium dioxide, zinc oxide, graphite, glass particles, for example glass spheres, nanoscale fillers, such as carbon nanotubes, nanoscale sheet silicates, nanoscale alumina ($Al_2O_3$), nanoscale titanium dioxide ($TiO_2$), graphene, permanently magnetic or magnetizable metal compounds and/or alloys, phyllosilicates and nanoscale silicon dioxide ($SiO_2$). The fillers may also have been surface treated.

Examples of phyllosilicates usable in the molding materials according to the invention include kaolins, serpentines, talc, mica, vermiculites, illites, smectites, montmorillonite, hectorite, double hydroxides or mixtures thereof. The phyllosilicates may have been surface treated or may be untreated.

One or more fibrous substances may also be employed. These are preferably selected from known inorganic reinforcing fibers, such as boron fibers, carbon fibers, silica fibers, ceramic fibers and basalt fibers; organic reinforcing fibers, such as aramid fibers, polyester fibers, nylon fibers, polyethylene fibers and natural fibers, such as wood fibers, flax fibers, hemp fibers and sisal fibers.

It is especially preferable to employ carbon fibers, aramid fibers, boron fibers, metal fibers or potassium titanate fibers.

The thermoplastic polymers distinct from component A), B) and C) are preferably selected from homo- or copolymers which comprise in copolymerized form at least one monomer selected from $C_2$-$C_{10}$-monoolefins, for example ethylene or propylene, 1,3-butadiene, 2-chloro-1,3-butadiene, vinyl alcohol and the $C_2$-$C_{10}$-alkyl esters thereof, vinyl chloride, vinylidene chloride, vinylidene fluoride, tetrafluoroethylene, glycidyl acrylate, glycidyl methacrylate, acrylates and methacrylates having alcohol components of branched and unbranched $C_1$-$C_{10}$-alcohols, vinylaromatics, for example styrene, acrylonitrile, methacrylonitrile, α,β-ethylenically unsaturated mono- and dicarboxylic acids, and maleic anhydride;
homo- and copolymers of vinyl acetals;
polyvinyl esters;
polycarbonates (PC);
polyesters such as polyalkylene terephthalates, polyhydroxyalkanoates (PHA), polybutylene succinates (PBS), polybutylene succinate adipates (PBSA);
polyethers;
polyether ketones;
thermoplastic polyurethanes (TPU);
polysulfides;
polysulfones;
polyether sulfones;
cellulose alkyl esters;
and mixtures thereof.

Examples include polyacrylates having identical or different alcohol radicals from the group of $C_4$-$C_8$ alcohols, particularly of butanol, hexanol, octanol and 2-ethylhexanol, polymethylmethacrylate (PMMA), methyl methacrylate-butyl acrylate copolymers, acrylonitrile-butadiene-styrene copolymers (ABS), ethylene-propylene copolymers, ethylene-propylene-diene copolymers (EPDM), polystyrene (PS), styrene-acrylonitrile copolymers (SAN), acrylonitrile-styrene-acrylate (ASA), styrene-butadiene-methyl methacrylate copolymers (SBMMA), styrene-maleic anhydride copolymers, styrene-methacrylic acid copolymers (SMA), polyoxymethylene (POM), polyvinyl alcohol (PVAL), polyvinyl acetate (PVA), polyvinyl butyral (PVB), polycaprolactone (PCL), polyhydroxybutyric acid (PHB), polyhydroxyvaleric acid (PHV), polylactic acid (PLA), ethyl cellulose (EC), cellulose acetate (CA), cellulose propionate (CP) or cellulose acetate/butyrate (CAB).

The at least one thermoplastic polymer optionally also present in the molding material according to the invention is preferably polyvinyl chloride (PVC), polyvinyl butyral (PVB), homo- and copolymers of vinyl acetate, homo- and copolymers of styrene, polyacrylates, thermoplastic polyurethanes (TPUs) or polysulfides.

Suitable preferred additives E) are lubricants and heat stabilizers but also flame retardants, light stabilizers (UV stabilizers, UV absorbers or UV blockers), dyes, nucleating agents, metallic pigments, metal flakes, metal-coated particles, antistats, conductivity additives, demolding agents, optical brighteners, defoamers, etc.

As component E) the molding materials according to the invention can comprise preferably 0.01% to 3% by weight, particularly preferably 0.02% to 2% by weight, in particular 0.05% to 1.0% by weight, of at least one heat stabilizer based on the total weight of the composition.

The heat stabilizers are preferably selected from copper compounds, secondary aromatic amines, sterically hindered phenols, phosphites, phosphonites and mixtures thereof.

If a copper compound is used the amount of copper is preferably 0.003% to 0.5% by weight, in particular 0.005% to 0.3% by weight and particularly preferably 0.01% to 0.2% by weight based on the total weight of the composition.

If stabilizers based on secondary aromatic amines are used the amount of these stabilizers is preferably 0.2% to 2% by weight, particularly preferably 0.2% to 1.5% by weight, based on the total weight of the composition.

If stabilizers based on sterically hindered phenols are used the amount of these stabilizers is preferably 0.1% to 1.5% by weight, particularly preferably 0.2% to 1% by weight, based on the total weight of the composition.

If stabilizers based on phosphites and/or phosphonites are used the amount of these stabilizers is preferably 0.1% to 1.5% by weight, particularly preferably from 0.2% to 1% by weight, based on the total weight of the composition.

Suitable compounds E) of mono- or divalent copper are, for example, salts of mono- or divalent copper with inorganic or organic acids or mono- or dihydric phenols, the oxides of mono- or divalent copper or the complexes of copper salts with ammonia, amines, amides, lactams, cyanides or phosphines, preferably Cu(I) or Cu(II) salts of hydrohalic acids or of hydrocyanic acids or the copper salts of aliphatic carboxylic acids. Particular preference is given to the monovalent copper compounds CuCl, CuBr, CuI, CuCN and Cu$_2$O and to the divalent copper compounds CuCl$_2$, CuSO$_4$, CuO, copper(II) acetate or copper(II) stearate.

The copper compounds are commercially available and/or the preparation thereof is known to those skilled in the art. The copper compound may be used as such or in the form of concentrates. A concentrate is to be understood as meaning a polymer, preferably of the same chemical nature as component A), comprising the copper salt in a high concentration. The use of concentrates is a standard method and is particularly often employed when very small amounts of an input material are to be added. It is advantageous to employ the copper compounds in combination with further metal halides, in particular alkali metal halides, such as NaI, KI, NaBr, KBr, wherein the molar ratio of metal halide to copper halide is 0.5 to 20, preferably 1 to 10 and particularly preferably 3 to 7.

Particularly preferred examples of stabilizers which are based on secondary aromatic amines and are usable in accordance with the invention include adducts of phenylenediamine with acetone (Naugard® A), adducts of phenylenediamine with linolenic acid, 4,4'-bis(α,α-dimethylbenzyl) diphenylamine (Naugard® 445), N,N'-dinaphthyl-p-phenylenediamine, N-phenyl-N'-cyclohexyl-p-phenylenediamine or mixtures of two or more thereof.

Preferred examples of stabilizers employable according to the invention and based on sterically hindered phenols include N,N'-hexamethylenebis-3-(3,5-di-tert-butyl-4-hydroxyphenyl)propionamide, bis(3,3-bis(4'-hydroxy-3'-tert-butylphenyl)butanoic acid) glycol ester, 2,1'-thioethyl bis(3-(3,5-di-tert-butyl-4-hydroxyphenyl))propionate, 4,4'-butylidenebis(3-methyl-6-tert-butylphenol), triethylene glycol 3-(3-tert-butyl-4-hydroxy-5-methylphenyl)propionate or mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythrityl diphosphite, tris(2,4-di-tert-butylphenyl) phosphite, diisodecyl pentaerythrityl diphosphite, bis(2,4-di-tert-butylphenyl) pentaerythrityl diphosphite, bis(2,6-di-tert-butyl-4-methylphenyl) pentaerythrityl diphosphite, diisodecyloxy pentaerythrityl diphosphite, bis(2,4-di-tert-butyl-6-methylphenyl) pentaerythrityl diphosphite, bis(2,4,6-tris(tert-butylphenyl)) pentaerythrityl diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenzo-[d,g]-1,3,2-dioxaphosphocin, 6-fluoro-2,4,8,10-tetra-tert-butyl-12-methyldibenzo-[d,g]-1,3,2-dioxaphosphocin, bis(2,4-di-tert-butyl-6-methylphenyl) methyl phosphite and bis(2,4-di-tert-butyl-6-methylphenyl) ethyl phosphite. Preference is given in particular to tris[2-tert-butyl-4-thio(2'-methyl-4'-hydroxy-5'-tert-butyl)phenyl-5-methyl]phenyl phosphite and tris(2,4-di-tert-butylphenyl) phosphite (Hostanox© PAR24: commercially available from BASF SE).

A preferred embodiment of the heat stabilizer consists in the combination of organic heat stabilizers (especially Hostanox PAR 24 and Irganox 1010), a bisphenol A-based epoxide (especially Epikote 1001) and copper stabilization based on CuI and KI. An example of a commercially available stabilizer mixture consisting of organic stabilizers and epoxides is Irgatec® NC66 from BASF SE. Heat stabilization based exclusively on CuI and KI is especially preferred. Other than the addition of copper or copper compounds, the use of further transition metal compounds, especially metal salts or metal oxides of group VB, VIB, VIIB or VIIIB of the Periodic Table, is possible or else precluded. It may moreover be preferable not to add transition metals of group VB, VIB, VIIB or VIIIB of the Periodic Table, for example iron powder or steel powder, to the molding material according to the invention.

The molding materials according to the invention may comprise as additive E) 0% to 30% by weight, particularly preferably 0% to 20% by weight, based on the total weight of the composition, of at least one flame retardant. When the inventive molding materials comprise at least one flame retardant, preferably in an amount of 0.01 to 30% by weight, particularly preferably of 0.1 to 20% by weight, based on the total weight of the composition. Suitable flame retardants include halogen-containing and halogen-free flame retardants and synergists thereof (see also Gächter/Müller, 3rd edition 1989 Hanser Verlag, chapter 11). Preferred halogen-free flame retardants are red phosphorus, phosphinic or diphosphinic salts and/or nitrogen-containing flame retardants such as melamine, melamine cyanurate, melamine sulfate, melamine borate, melamine oxalate, melamine phosphate (primary, secondary) or secondary melamine pyrophosphate, neopentyl glycol boric acid melamine, guanidine and derivatives thereof known to those skilled in the art, and also polymeric melamine phosphate (CAS No.: 56386-64-2 and 218768-84-4 and also EP-A-10 95 030), ammonium polyphosphate, trishydroxyethyl isocyanurate (optionally also ammonium polyphosphate in admixture with trishydroxyethyl isocyanurate) (EP-A058 456 7). Further N-containing or P-containing flame retardants or PN condensates suitable as flame retardants, as well as the synergists customary therefor such as oxides or borates, may be found in DE-A-10 2004 049 342. Suitable halogenated flame retardants are for example oligomeric brominated polycarbonates (BC 52 Great Lakes) or polypentabromobenzyl acrylates with N greater than 4 (FR 1025 Dead sea bromine), reaction products of tetrabromobisphenol A with epoxides, brominated oligomeric or polymeric styrenes, dechlorane, which are usually used with antimony oxides as synergists (for details and further flame retardants see DE-A-10 2004 050 025).

The polyamide molding compositions are produced by methods known per se. These include the mixing of the components in the appropriate proportions by weight.

It is also possible to employ recyclates of the individual components or else of mixtures, in particular of the components A) and B). Through addition of the component C) such recyclates may be converted into molding materials according to the invention.

The mixing of the components is preferably accomplished at elevated temperatures by commixing, blending, kneading, extruding or rolling. The temperature during mixing is preferably in a range from 220° C. to 340° C., particularly preferably from 240° C. to 320° C. and especially from 250° C. to 300° C. Suitable methods are known to those skilled in the art.

Molded Articles

The present invention further relates to molded articles produced using the polyamide molding materials according to the invention.

The polyamide molding materials may be used for producing moldings by any desired suitable processing techniques. Suitable processing techniques are especially injection molding, extrusion, coextrusion, thermoforming or any other known polymer shaping method. These and further examples may be found for example in "Einfärben von Kunststoffen" [Coloring of Plastics], VDI-Verlag, ISBN 3-18-404014-3.

The polyamide molding materials are further advantageously suitable for use for automotive applications, for production of moldings for electrical and electronic components including especially in the high-temperature sector.

A specific embodiment is that of molded articles in the form of or as part of a component part for the automotive sector, especially selected from cylinder head covers, engine covers, housings for charge air coolers, charge air cooler valves, intake pipes, intake manifolds, connectors, gears, fan impellers, cooling water tanks, housings or housing parts for heat exchangers, coolant coolers, charge air coolers, thermostats, water pumps, heating elements, securing parts.

Automotive interior uses include uses for instrument panels, steering column switches, seat parts, headrests, center consoles, transmission components and door modules and automotive exterior uses include A, B, C or D pillar covers, spoilers, door handles, exterior mirror components, windshield wiper components, windshield wiper housings, decorative grilles, cover strips, roof railings, window frames, sunroof frames, aerial trim, front and rear lights, engine covers, cylinder head covers, intake pipes, windshield wipers and exterior bodywork parts.

A further specific embodiment is that of shaped bodies as such or as part of an electrical or electronic passive or active component, of a printed circuit board, of part of a printed circuit board, of a housing constituent, of a film, or of a wire, more particularly in the form of or as part of a switch, of a plug, of a bushing, of a distributor, of a relay, of a resistor, of a capacitor, of a winding or of a winding body, of a lamp, of a diode, of an LED, of a transistor, of a connector, of a regulator, of an integrated circuit (IC), of a processor, of a controller, of a memory element and/or of a sensor.

The polyamide molding materials according to the invention are moreover especially suitable for producing plug connectors, microswitches, microbuttons and semiconductor components, especially reflector housings of light-emitting diodes (LEDs).

A specific embodiment is that of molded articles as securing elements for electrical or electronic components, such as spacers, bolts, fillets, push-in guides, screws and nuts.

Especially preferred is a molding in the form of or as part of a socket, of a plug connector, of a plug or of a bushing. The molding preferably includes functional elements which require mechanical toughness. Examples of such functional elements are film hinges, snap-in hooks and spring tongues.

Possible uses of the polyamides according to the invention for the kitchen and household sector are for producing components for kitchen machines, for example fryers, clothes irons, knobs and buttons, and also applications in the gardens sector, for example components for irrigation systems or garden equipment, door handles.

The thermoplastic molding materials according to the invention are further suitable as an adhesive layer for metals. They may accordingly be used for coating sheet metals. In this regard reference may also be made to WO 2005/014278.

The polyamide molding material for producing moldings is produced by methods known per se. Reference is made here to the abovementioned processes for producing the polyamide composition. These include the mixing of the components in the appropriate proportions by weight. The mixing of the components is preferably accomplished at elevated temperatures by commixing, blending, kneading, extruding or rolling. The temperature during mixing is preferably in a range from 220° C. to 340° C., particularly preferably from 240° C. to 320° C. and especially from 250° C. to 300° C. Premixing of individual components may be advantageous. It is additionally also possible to produce the moldings directly from a physical mixture (dryblend) of premixed components and/or individual components which has been produced well below the melting point of the polyamide. In that case the temperature during the mixing is preferably 0° C. to 100° C., particularly preferably 10° C. to 50° C., in particular ambient temperature (25° C.). The molding materials may be processed to afford moldings by customary methods, for example by injection molding or extrusion. They are especially suitable, for example, for materials for covers, housings, accessory parts, sensors, for applications in, for example, the automotive, electrical engineering, electronics, telecommunications, information technology, computer, household, sports, medical, or entertainment sectors.

The examples which follow are used to elucidate the invention without restricting it in any way.

EXAMPLES

Examples I

The following input materials were used:
Polyamide 6: Ultramid® B24N 03 from BASF SE, melting point: 220° C., viscosity number (0.5% in 96% $H_2SO_4$): 115-135 ml/g, amino end groups: 39-47 mmol/kg
Elastomer 1: Ethylene-propylene elastomer grafted with maleic anhydride; Exxelor™ VA 1801 from ExxonMobil Petroleum & Chemical BVBA, density: 0.88 g/ml, melt flow index (230° C./10 kg; ISO1133): 9 g/10 min, glass transition temperature: −44° C.
Elastomer 2: Ethylene-butyl acrylate copolymer, Lucalen A2700M from lyondellbasell
Elastomer 3: Ethylene-butyl acrylate copolymer, Lucalen A2540D from lyondellbasell
PA6/6.36: Copolyamide of 67% by weight of caprolactam, 5% by weight of hexamethylenediamine and 28% by weight of $C_{36}$-diacid, melting point: 196° C.
Stabilizer 1: Irganox® B 1171 from BASF SE
Filler: Micro Talc IT Extra from Mondo Minerals BV
Polyamide 6.10: Zytel RS LC3060 NC010 from DuPont de Nemours (Deutschland) GmbH, melting point: 220° C., viscosity number (formic acid, 0307): 135-149 ml/g
Elastomer 4: Ethylene-i-octene copolymer grafted with maleic anhydride, FUSABOND N 598 from DuPont International Operations Sàrl, glass transition temperature (ASTM 03418): −50° C., density: 0.87 g/ml
Elastomer 5: Ethylene-butyl acrylate copolymer grafted with maleic anhydride, Compoline CO/PA BA from AUSERPOLIMERI SRL, density: 0.92-0.93 g/ml, melt flow index 190° C./2.16 kg, ISO1133): 2-4 g/10 min
Stabilizer 2: Irganox® 1098 ID from BASE SE
Lubricant: metal stearate The molding materials were produced by mixing the ingredients listed below in a twin-screw extruder ZE 25 A UTXi at temperatures of 260° C. The properties specified in the tables 1 and 2 below were determined by the specified standards valid 2018. The proportions of the ingredients are reported in % by weight.

TABLE 1

| Example | | | C1 | C2 | 1 | 2 |
|---|---|---|---|---|---|---|
| Polyamide 6 | | | 59.1 | 59.1 | 49.1 | 49.1 |
| Stabilizer 1 | | | 0.5 | 0.5 | 0.5 | 0.5 |
| Elastomer 1 | | | 15 | 15 | 15 | 15 |
| Filler | | | 0.4 | 0.4 | 0.4 | 0.4 |
| Elastomer 2 | | | 25 | | 25 | |
| Elastomer 3 | | | | 25 | | 25 |
| PA6/6.36 | | | | | 10 | 10 |
| Tensile modulus | ISO527 | MPa | 1068 | 1007 | 1027 | 1006 |
| Yield stress, 50 mm | ISO527 | MPa | 29 | 27 | 29 | 28 |
| Yield strain, 50 mm/min. | ISO527 | % | 6.9 | 6.5 | 6.5 | 6.5 |
| Nominal breaking elongation | ISO527 | % | 181 | 105 | 236 | 176 |
| Charpy notched impact strength (23° C.) | ISO179/1eA | kJ/m² | 83 | 86 | 111 | 107 |
| Charpy notched impact strength (−30° C.) | ISO179/1eA | kJ/m² | 17 | 19 | 28 | 23 |

TABLE 2

| Example | | | C3 | 3 | 4 |
|---|---|---|---|---|---|
| Polyamide 6.10 | | | 75.55 | 52.55 | 39.55 |
| Elastomer 4 | | | 20.0 | 20.0 | 20.0 |
| Elastomer 5 | | | 4.0 | 4.0 | 4.0 |
| Stabilizer 2 | | | 0.200 | 0.200 | 0.200 |
| Lubricant | | | 0.255 | 0.255 | 0.255 |
| PA6/6.36 | | | | 23 | 36 |
| Tensile modulus | ISO527 | MPa | 1450 | 1356 | 1188 |
| Yield stress, 50 mm | ISO527 | MPa | 39 | 36 | 32 |
| Yield strain, 50 mm/min. | ISO527 | % | 5.4 | 4.3 | 4.3 |
| Nominal breaking elongation | ISO527 | % | 142 | 197 | 221 |
| Charpy notched impact strength (23° C.) | ISO179/1eA | kJ/m² | 82 | 91 | 94 |

Examples II

The following input materials were used:
Polyamide 6: Ultramid B22 NE 01 from BASE SE, viscosity number (0.5% in 96% $H_2SO_4$): 103-112 ml/g, amino end groups: 56-63 mmol/kg
Glass fiber: Chopped glass fiber PPG 3660 from Electric Glass Fiber NL B.V.
Elastomer 6: Amorphous ethylene copolymer grafted with 0.5-1% by weight of maleic anhydride, density: 0.8 g/ml, glass transition temperature: −59° C., Exxelor™ VA 1803 from ExxonMobil Petroleum & Chemical BVBA Carbon black: Masterbatch composed of 30% by weight of carbon black in PA6; Ultrabatch 420 from Clariant Plastics & Coatings (Deutschland) GmbH
Lubricant: Acrawax C Beads from Lonza Cologne GmbH
Stabilizer 2: Irganox 1098 ID from BASF SE
PA6/6.36: Copolyamide of 67% by weight of caprolactam, 5% by weight of hexamethylenediamine and 28% by weight of $C_{36}$-diacid, melting point: 196° C.

The molding materials were produced by mixing the ingredients listed below in a twin-screw extruder ZSK 25 at a temperature of 260° C. The properties specified in the tables 3 and 4 below were determined by the specified standards valid 2018. The proportions of the ingredients are reported in % by weight.

TABLE 3

| Example | | | C5 | 5 | 6 |
|---|---|---|---|---|---|
| Polyamide 6 | | | 56.20 | 54.20 | 51.20 |
| Glass fiber | | | 30.00 | 30.00 | 30.0 |
| Elastomer 6 | | | 10.00 | 10.00 | 10.00 |
| Carbon black | | | 3.30 | 3.30 | 3.30 |
| Lubricant | | | 0.30 | 0.30 | 0.30 |
| Stabilizer 2 | | | 0.20 | 0.20 | 0.20 |
| PA6/6.36 | | | | 2.00 | 5.00 |
| Tensile modulus | ISO527 | MPa | 8055 | 8091 | 7918 |
| Tensile stress at break | ISO527 | MPa | 124.33 | 126.89 | 122.08 |
| Tensile strain at break | ISO527 | % | 3.58 | 3.70 | 3.76 |
| Charpy notched impact strength (23° C.) | ISO179/1eA | kJ/m$^2$ | 15.3 | 15.4 | 17.2 |
| Charpy notched impact strength (−30° C.) | ISO179/1eA | kJ/m$^2$ | 11.3 | 12.2 | 12.5 |
| Charpy unnotched impact strength (23° C.) | | | 83.0 | 90.6 | 93.8 |
| Charpy unnotched impact strength (−30° C.) | | | 90.5 | 95.6 | 95.1 |

The invention claimed is:

1. A method of using copolyamides c) produced by polymerization of components
    A') 15% to 84% by weight of at least one lactam, and
    B') 16% to 85% by weight of a monomer mixture (M) comprising components
        B1') at least one $C_{32}$-$C_{40}$-dimer acid and
        B2') at least one $C_4$-$C_{12}$-diamine,
    wherein the percentages by weight of the components A') and B') are in each case based on the sum of the percentages by weight of the components A') and B'),
    the method comprising using the copolyamides c) to increase an impact strength and/or breaking elongation of molded articles made of thermoplastic molding materials comprising thermoplastic polyamides, which are different from copolyamides c),
    wherein the thermoplastic molding materials comprise
        a) 44.0 to 98.8% by weight of at least one thermoplastic polyamide which is different from copolyamide c) as component A),
        b) 1.0 to 50.0% by weight of at least one elastomer as component B), selected from the group consisting of
            b1) copolymers of ethylene with at least one comonomer selected from the group consisting of $C_{3-12}$-olefins, $C_{1-12}$-alkyl (meth)acrylates, (meth)acrylic acid and maleic anhydride as component B1), and
            b2) polyethylene or polypropylene as component B2), grafted with maleic anhydride,
        wherein component B1) is optionally additionally grafted with maleic anhydride,
        c) 0.2% to 10% by weight of at least one copolyamide c) as component C),
        d) 0% to 60% by weight of glass fibers as component D), and
        e) 0% to 30% by weight of further additives and processing aids as component
    wherein the weight percentages for the components A) to E) sum to 100% by weight.

2. A thermoplastic molding material comprising
    a) 44.0 to 98.8% by weight of at least one thermoplastic polyamide which is different from component C) as component A), b) 1.0 to 50.0% by weight of at least one elastomer as component B), selected from the group consisting of
   b1) copolymers of ethylene with at least one comonomer selected from the group consisting of C$_{3-12}$-olefins, C$_{1-12}$-alkyl (meth)acrylates, (meth)acrylic acid and maleic anhydride as component B1), and
   b2) polyethylene or polypropylene as component B2), grafted with maleic anhydride,
wherein component B1) is optionally additionally grafted with maleic anhydride,
c) 0.2% to 10% by weight of at least one copolyamide produced by polymerization of components
   A') 15% to 84% by weight of at least one lactam, and
   B') 16% to 85% by weight of a monomer mixture (M) comprising components
      B1') at least one C$_{32}$-C$_{40}$-dimer acid and
      B2') at least one C$_4$-C$_{12}$-diamine,
   wherein the percentages by weight of the components A') and B') are in each case based on the sum of the percentages by weight of the components A') and B'), as component C)
d) 0% to 60% by weight of glass fibers as component D), and
e) 0% to 30% by weight of further additives and processing aids as component E),
wherein the weight percentages for the components A) to E) sum to 100% by weight.

3. The thermoplastic molding material according to claim 2, wherein in component C) the component A') is selected from the group consisting of 3-aminopropanolactam, 4-aminobutanolactam, 5-aminopentanolactam, 6-aminohexanolactam, 7-aminoheptanolactam, 8-aminooctanolactam, 9-aminononanolactam, 10-aminodecanolactam, 11-aminoundecanolactam, and 12-aminododecanolactam.

4. The thermoplastic molding material according to claim 2, wherein in component C) the component B2') is selected from the group consisting of tetramethylenediamine, pentamethylenediamine, hexamethylenediamine, decamethylenediamine, and dodecamethylenediamine.

5. The thermoplastic molding material according to claim 2, wherein component C) is PA6/6.36.

6. The thermoplastic molding material according to claim 2, wherein component A) is selected from the group consisting of polyamide 6, polyamide 66, polyamide 6.10, and copolymers or mixtures thereof.

7. The thermoplastic molding material according to claim 2, wherein it comprises component B1) in which the at least one comonomer is selected from the group consisting of C$_{3-8}$-olefins, C$_{2-6}$-alkyl acrylates, and maleic anhydride.

8. The thermoplastic molding material according to claim 2, characterized in that it comprises component B1) grafted with maleic anhydride.

9. A process for producing a thermoplastic molding material according to claim 2, the process comprising mixing the components A) to E).

10. A method of using the thermoplastic molding material according to claim 2, the method comprising using the thermoplastic molding material for producing fibers, films, and molded articles.

11. A fiber, film, or molded article made of a thermoplastic molding material according to claim 2.

12. A process for producing fibers, films, or molded articles, the process comprising extrusion, injection molding or blow molding of the thermoplastic molding material according to claim 2.

* * * * *